United States Patent
Hipshier et al.

(10) Patent No.: US 8,007,020 B2
(45) Date of Patent: Aug. 30, 2011

(54) FLEXIBLE INTERIOR COMPONENT

(75) Inventors: Jason M. Hipshier, Hudsonville, MI (US); Kristan Marie Pierce, West Olive, MI (US)

(73) Assignee: Johnson Control Technology Company, Holland, MI (US)

( * ) Notice: Subject to any disclaimer, the term of this patent is extended or adjusted under 35 U.S.C. 154(b) by 578 days.

(21) Appl. No.: 11/943,283

(22) Filed: Nov. 20, 2007

(65) Prior Publication Data

US 2008/0129071 A1    Jun. 5, 2008

Related U.S. Application Data

(60) Provisional application No. 60/860,271, filed on Nov. 21, 2006, provisional application No. 60/924,848, filed on Jun. 1, 2007.

(51) Int. Cl.
*B60J 1/20* (2006.01)
(52) U.S. Cl. .................... 296/37.8; 296/24.34
(58) Field of Classification Search .............. 296/37.8, 296/24.34
See application file for complete search history.

(56) References Cited

U.S. PATENT DOCUMENTS

| | | | |
|---|---|---|---|
| 2006/0024476 A1 * | 2/2006 | Leland et al. | 428/137 |
| 2006/0037713 A1 | 2/2006 | Ichimaru et al. | |
| 2006/0186696 A1 | 8/2006 | Dobos et al. | |
| 2009/0008955 A1 * | 1/2009 | Desoto | 296/1.08 |

FOREIGN PATENT DOCUMENTS

| | | |
|---|---|---|
| DE | 40 10 241 A1 | 4/1991 |
| DE | 10 2005 023 062 B3 | 10/2006 |
| EP | 1 777 109 B1 | 4/2007 |
| JP | 03 068474 A | 3/1991 |

OTHER PUBLICATIONS

The International Preliminary Report on Patentability dated Jun. 4, 2009 for corresponding application PCT/US2007/085207 (2 pages).
The PCT Written Opinion dated Jun. 4, 2009 for corresponding application PCT/US2007/085207 (7 pages).

* cited by examiner

*Primary Examiner* — Joseph D Pape
(74) *Attorney, Agent, or Firm* — Foley & Lardner LLP

(57) ABSTRACT

There is disclosed a vehicle console trim component. The trim component can include an articulated door with a plurality of slats, a substrate, and a flexible layer including a pattern for decoration disposed on and supported by the substrate. The flexible layer will maintain the pattern for decoration as the articulated door is cycled. The pattern for the vehicle trim component may be a photographic image. An overcoat also can be disposed on the flexible layer.

19 Claims, 6 Drawing Sheets

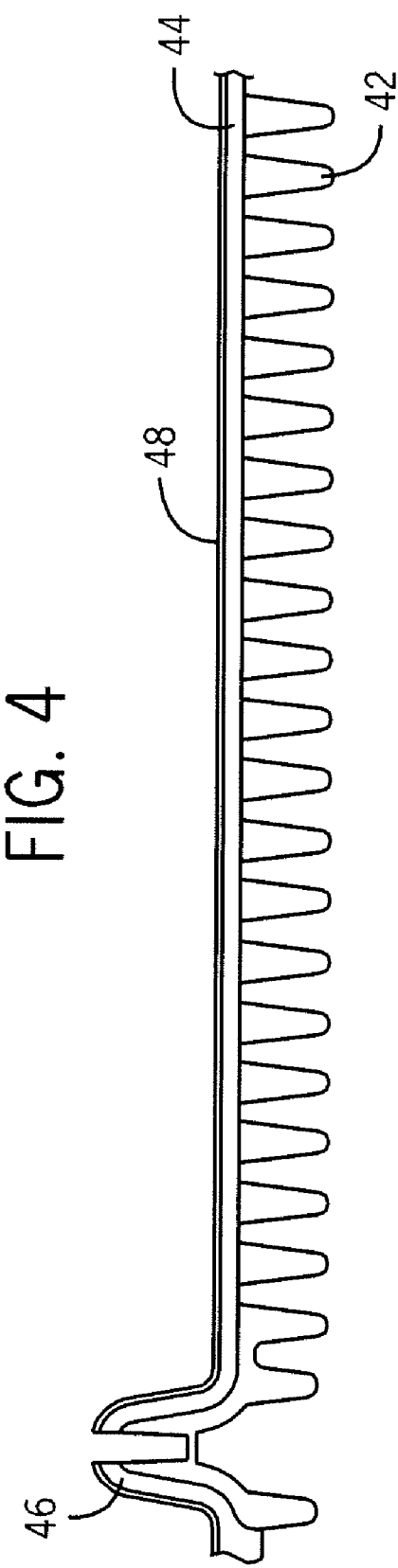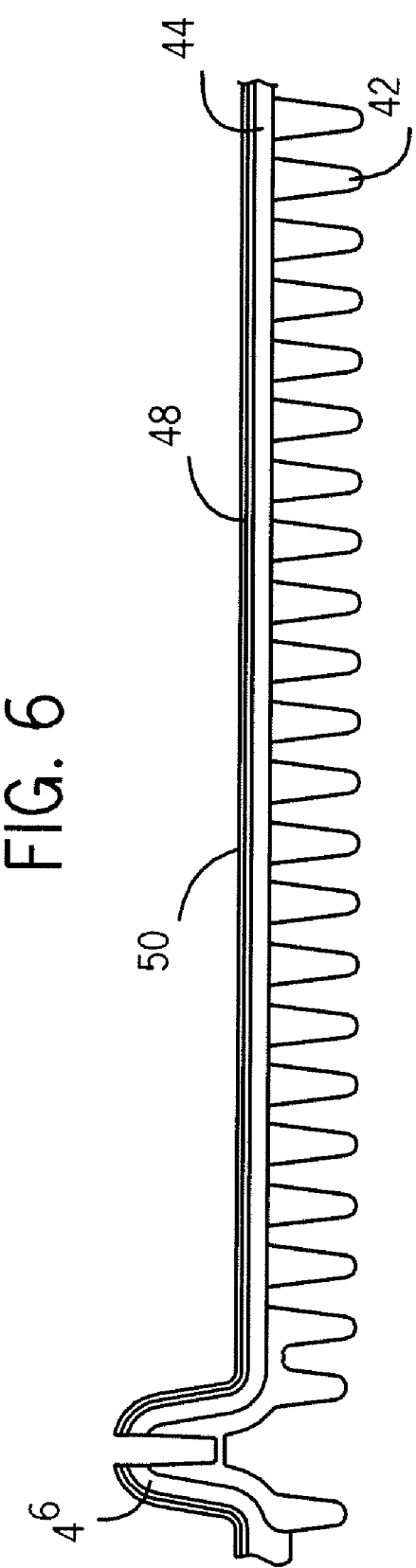

FLEXIBLE INTERIOR COMPONENT

CROSS-REFERENCE TO RELATED APPLICATIONS

This Application claims priority to U.S. Provisional Application No. 60/860,271, filed Nov. 21, 2006, and U.S. Provisional Application No. 60/924,848, filed Jun. 1, 2007, both of which are hereby incorporated by reference herein in their entirety.

BACKGROUND

The following background is provided simply as an aid in understanding the disclosed material and is not admitted to describe or constitute prior art.

Center consoles are often provided between the front seats of a vehicle and may be configured as a storage area and/or an arm rest area. Such consoles may further have doors to selectively close a storage area provided within the console. For example, an articulated or flexible door, known in the art as a tambour door, may be used in a console to close an opening of a storage area.

Tambour doors are particularly useful for closing an opening having a non-linear profile, because tambour doors can ride on tracks or rails that follow the non-linear profile of the opening. Typically, tambour doors include multiple slats or segments that fit into and ride on the tracks or rails. The slats may be composed from a wide variety of materials including wood, metal or a polymer. The slats can be connected on an upper or lower face by a flexible backing or substrate. For example, felt may be used as a connecting substrate on a lower face of the slats, or a polymer may be used as a connecting substrate on an upper face of the slats.

It may be desirable to create a faux or laminate finish either on the slats (e.g., when the substrate is on the lower face of the slats) or on the substrate (e.g., when the substrate is on the upper face of the slats). For example, the faux or laminate finish creates the appearance of one material (e.g., for aesthetic reasons) while allowing the use of a second material as the slats or substrate (e.g., a stronger, more durable, or less expensive material). Moreover, a substrate disposed on top of the slats may be formed from a polymer using an extrusion or injection molding process. It often shows imperfections that result from the molding process, such as flow lines, knits, and other defects, which provide an undesirable aesthetic appearance. The faux or laminate finish can hide those defects.

To create such a faux or laminate finish, it is known to adhere a plurality of individual pieces of a thin laminate on the slats or the substrate. However, these laminate pieces may be prone to peeling or otherwise losing adhesion with the slats or substrate and may cause the door to bind in the track or rail. Conventional laminate pieces also may show stress-marks or crack when the door flexes. Additionally, adhering individual laminate pieces to the individual slats or the substrate is often time-consuming and labor intensive.

It would be desirable to provide a flexible interior component with a layer that defines an aesthetically pleasing outer surface, while maintaining flexibility of the trim component as the component is cycled. It would also be desirable to apply a finish to an interior component that creates a different appearance and that will withstand bending or flexing that the component may undergo.

SUMMARY

An embodiment of the present invention relates to a vehicle console in a vehicle including a vehicle floor and two spaced apart seats. The vehicle console includes a structure including a front wall, a rear wall and two opposed side walls coupled to the front wall and rear wall, wherein an interior space is defined, and an opening in communication with the interior space. The vehicle console further includes an articulated door coupled to the structure and configured to close the opening. The articulated door includes a plurality of slats, a substrate connecting the plurality of slats, and a flexible layer disposed on the substrate and that provides an appearance differing from the appearance of the substrate, wherein the flexible layer will substantially maintain the appearance as the substrate is cycled.

Another embodiment of the present invention relates to a vehicle trim component including a flexible substrate, and a flexible layer disposed on the substrate. The flexible layer that provides an appearance differing from the appearance of the substrate. The flexible layer will substantially maintain the appearance as the substrate is cycled.

Yet another embodiment of the present invention relates to a method of altering the appearance of a flexible vehicle trim component. The method includes providing a flexible substrate that forms at least a portion of the flexible vehicle trim component, and disposing a flexible layer on the substrate that provides an appearance differing from the appearance of the substrate. The flexible layer will substantially maintain the appearance as the substrate is cycled.

BRIEF DESCRIPTION OF THE DRAWINGS

FIG. 4 is a section view of the door in FIG. 3 taken along line 4-4.

FIG. 6 is a section view of the door in FIG. 5 (when assembled) taken along line 6-6.

DETAILED DESCRIPTION

There is disclosed an interior trim component of a vehicle and, in particular, a flexible door having a flexible ink coating including a pattern for decoration. While the disclosure describes a flexible door, the invention could be applied to other flexible interior components, such as portions of the steering column, shutter strips, close-outs, armrest cover, or the like.

Figure 1:
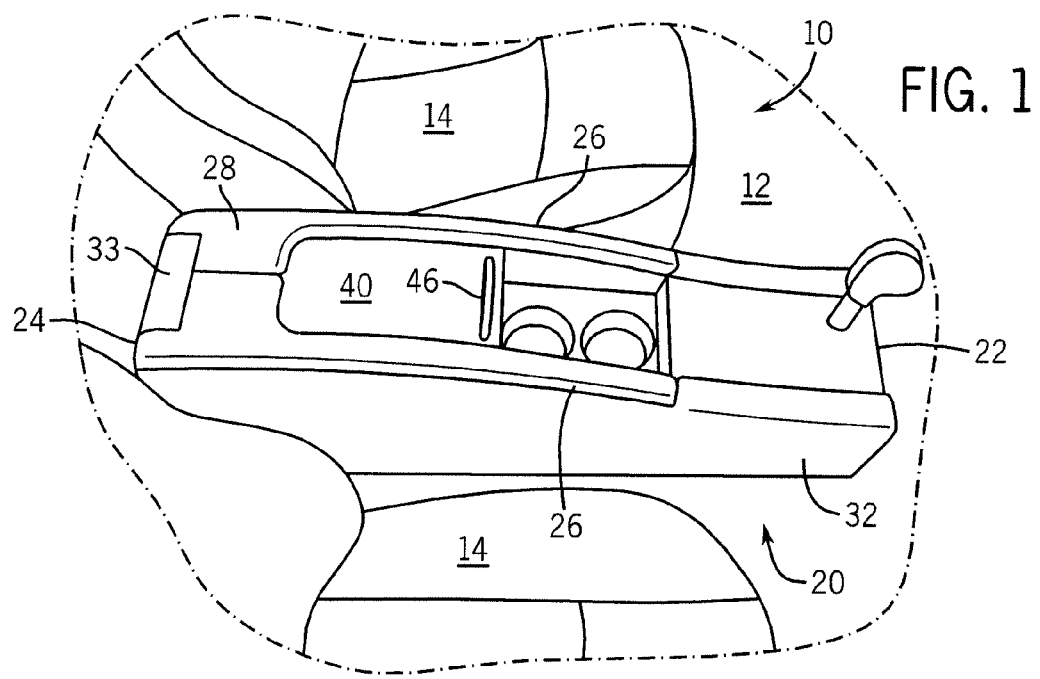
FIG. 1 is an isometric pictorial view of a console for a vehicle with a door according to an exemplary embodiment showing the door in the console in a closed configuration.
Figure 2:
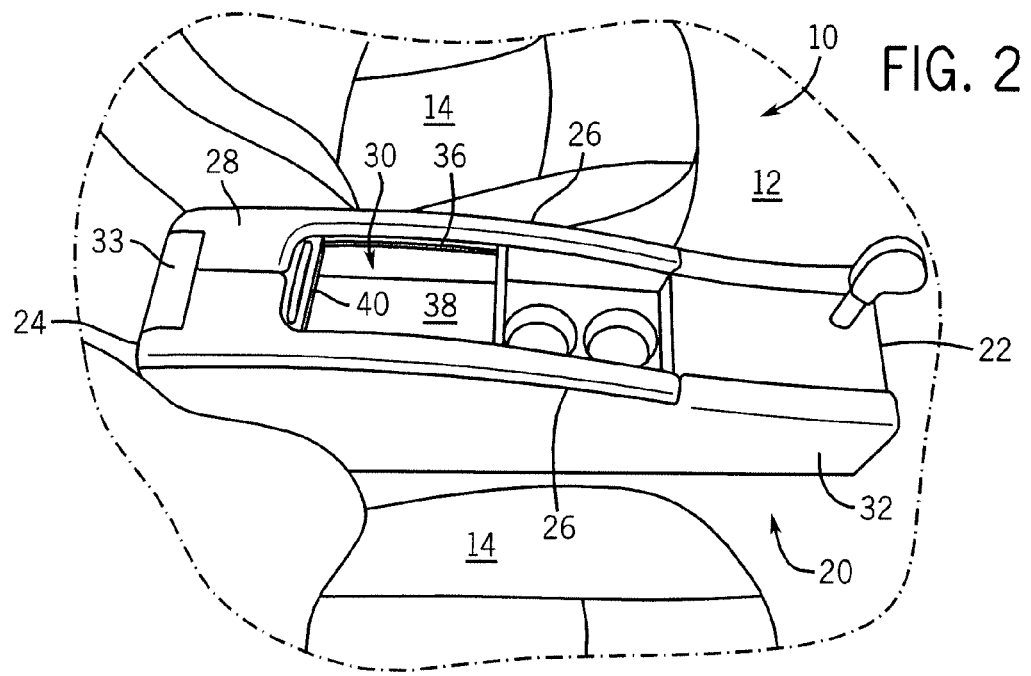
FIG. 2 is an isometric pictorial view of a console in FIG. 1 showing the door in the console in an open configuration.
Figure 3:
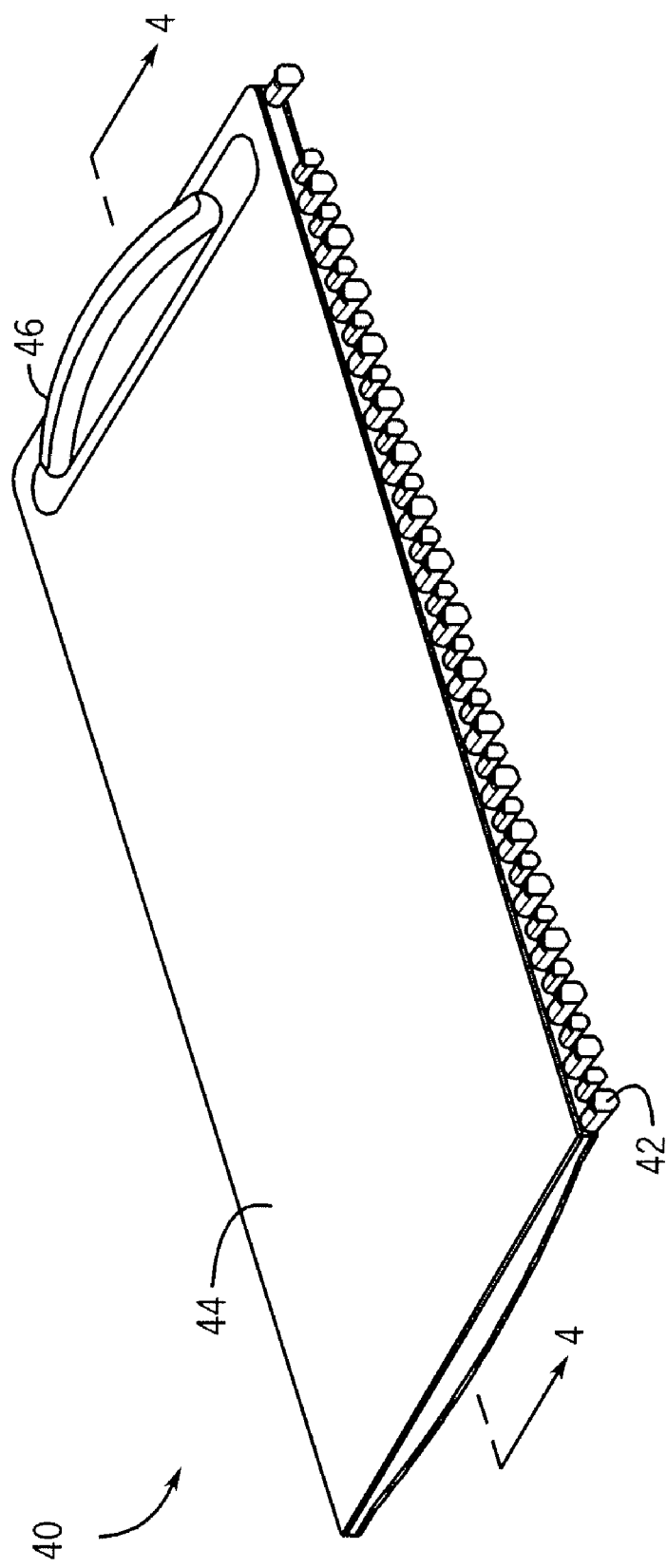
FIG. 3 is an isometric view of an articulated tambour door according to an exemplary embodiment.

Referring to FIGS. 1 and 2, a console 20 for a vehicle 10 is shown according to an exemplary embodiment. Console 20 can be coupled to a vehicle floor 12 between two seats 14. According to this exemplary embodiment, console 20 is configured to provide a storage area and an arm rest for an occupant of one or both seats 14. Console 20 can be a generally prismatic structure with a front wall 22, a rear wall 24, two opposed and generally symmetrical side walls 26, and a top surface 28.

Console 20 may include two side panels 32. The two panels 32 can form the main body of console 20, each panel 32 providing one of the side walls 26 of console 20 and portions of the rear wall 24, front wall 22 and top surface 28. Side walls 26 can have an upper contour that is a compound curve having both convex and concave portions such that each of the side walls 26 is substantially higher proximate to rear wall 24 than it is proximate to front wall 22. Panels 32 form a curved top surface 28 supported by the main body. Top surface 28 includes an opening 30 configured to allow a user to access the interior of console 20, within which there may be disposed an inner partition or insert 38 (e.g., interior, partition, bin, liner etc.). Console 20 also may include a rear panel 33. This rear panel 33 can form a portion of the rear wall 24 and the top surface 28.

Console 20 preferably includes a flexible interior component, namely a door 40, configured to close the opening 30 in the console 20. Because of the curved nature of top surface 28, door 40 preferably is a flexible or articulated door. According to an exemplary embodiment, door 40 is a tambour door and rides on tracks or rails 36. Tracks 36 can have, for example, a generally C-shaped cross section and may be coupled to panels 32 or integrally formed within panels 32.

As a tambour door, door 40 has a plurality of narrow segments, elements, or slats 42 and is configured to follow track 36 on a path that may follow the upper contour of side walls 26. As shown best in FIG. 4, door 40 includes a flexible portion or substrate 44 that couples together and supports the slats 42 and provides an outer surface. In this embodiment, the slats 42 can be formed from a conventional material, such as a thermoplastic polymer (PP), and the substrate 44 can be formed, for example, from a thermoplastic polymer (TPE). The slats 42 and substrate 44, however, can be made from other suitable materials. Door 40 may also include a handle or protrusion 46 on one end to allow a user to more easily grasp and manipulate door 40. According to other exemplary embodiments, door 40 may include a depression, recession or opening to allow a user to more easily grasp and manipulate door 40.

Figure 5:
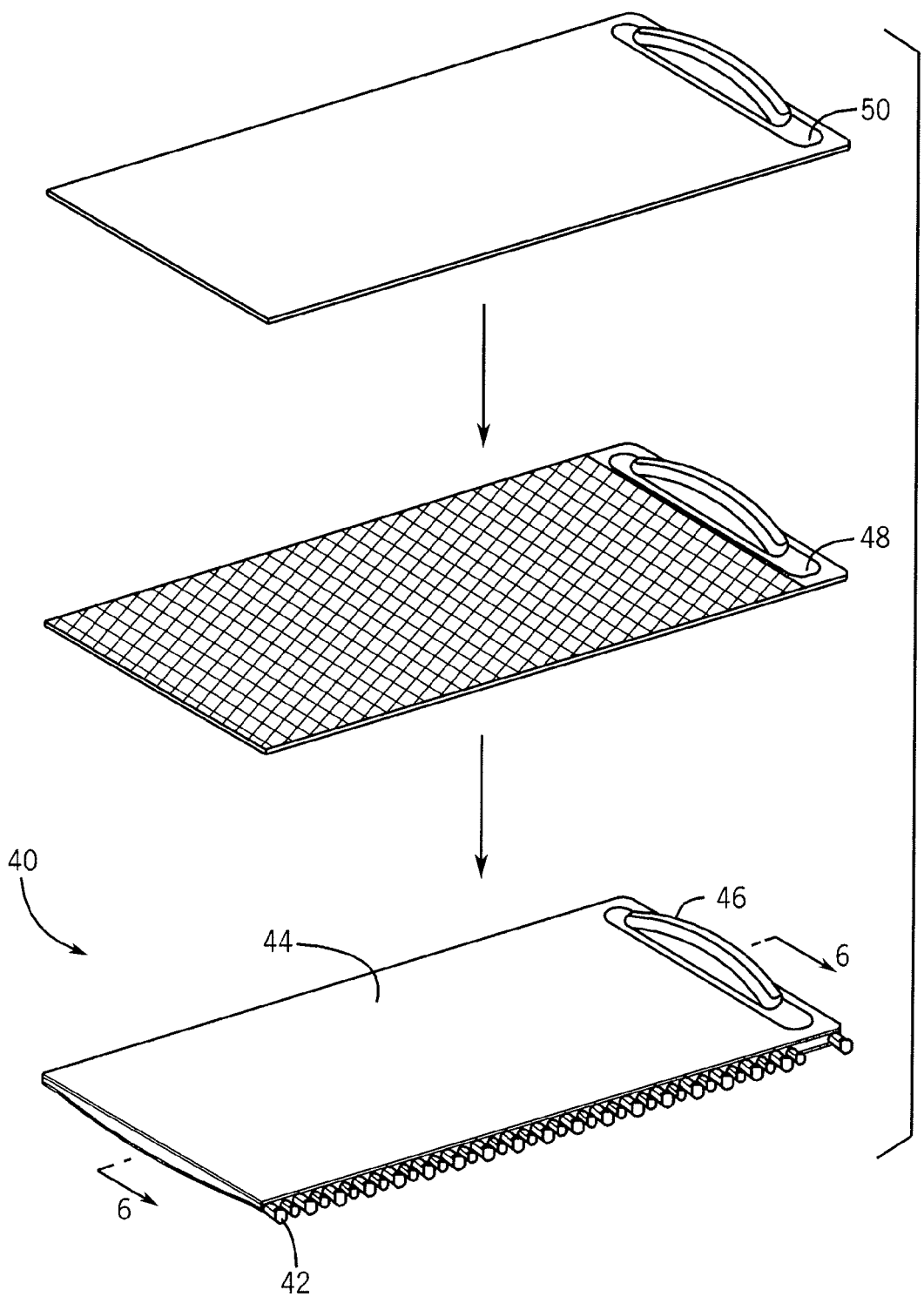
FIG. 5 is an exploded view of an articulated tambour door according to another exemplary embodiment.
Figure 7:
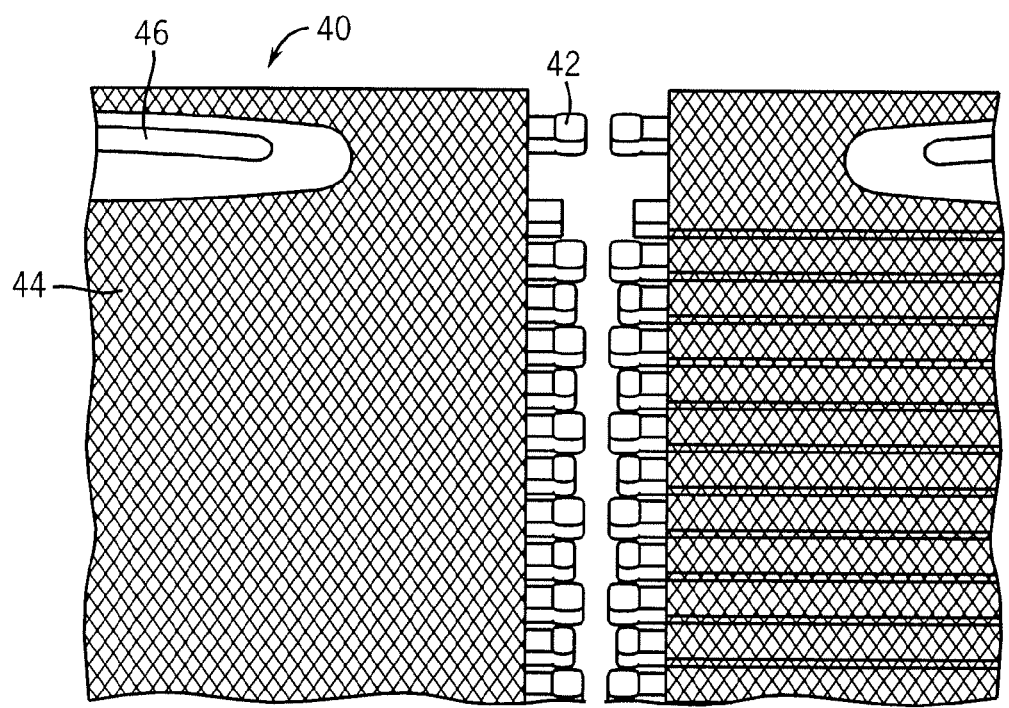
FIG. 7 is a top plan view of a door according to an exemplary embodiment with an exemplary pattern next to a door including a series of grooves with the same pattern.
Figure 8:
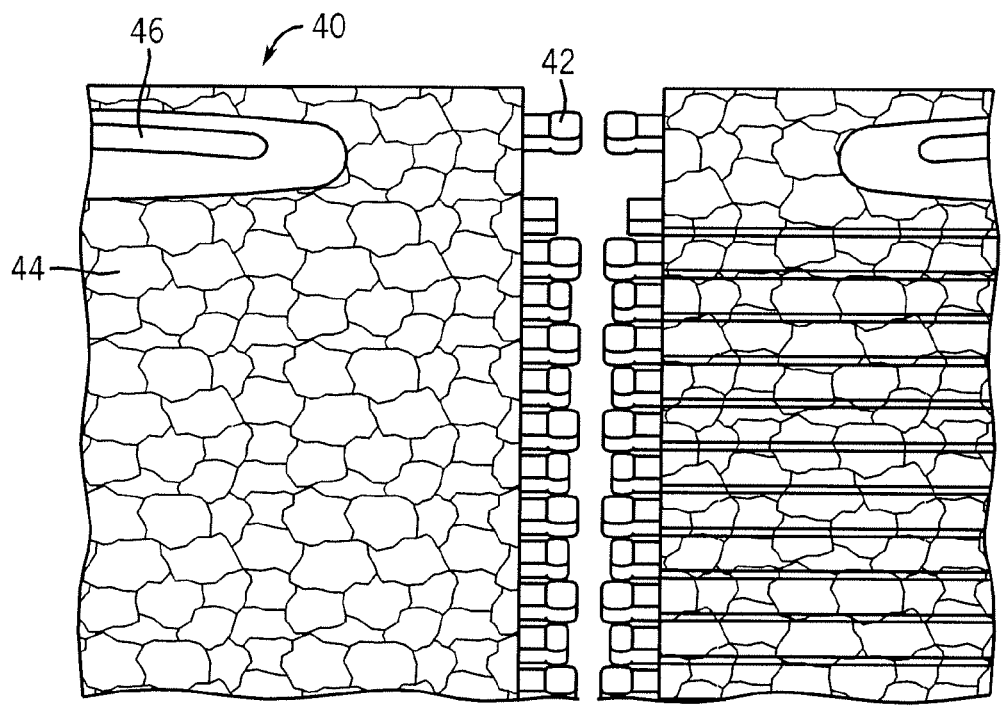
FIG. 8 is a top plan view of a door according to an exemplary embodiment with an exemplary metallic pattern next to a door including a series of grooves with the same pattern.

A flexible layer 48, as shown in FIG. 4, can be provided on the flexible portion or substrate 44. The flexible layer 48 may be continuous or it may be disposed on only intermittent portions of the substrate 44. The flexible layer 48 preferably provides a pattern or appearance to the substrate 44 that differs from the pattern or appearance of the substrate 44. For example, the pattern may be for decoration. According to various exemplary embodiments, the layer 48 may simulate a geometric pattern (as shown in FIGS. 5 and 7), a metallic finish (as shown in FIG. 8), or some other design (e.g., a wood grain, a reproduction of a photograph, another graphic image or pattern, etc.). The flexible layer 48 preferably also has sufficient flexibility to inhibit the flexible layer 48 from cracking or becoming disengaged from the substrate 44 when flexed or cycled.

According to one exemplary embodiment, the layer 48 can be an ink layer that is applied to door 40 by, for example, a liquid pressure transfer process. In one such exemplary process (such as a hydrographic process), the ink is applied to a water-soluble transfer film, which is then fed onto a pool of water upon which it floats. Substrate 44 is lowered into the pool and the water pressure cooperates with the downward force upon the substrate 44 to transfer the ink onto the substrate 44, forming ink layer 48. Ink layer 48 also may be formed on the substrate 44 by any other process that suitably applies an ink layer to a flexible substrate.

Referring now to FIGS. 5 and 6 another embodiment of a tambour door 40 is shown including a flexible layer 48. In this embodiment, a top coat 50 is applied on the flexible layer 48. Preferably the top coat 50 is substantially clear and is configured to protect the flexible layer 48 from wear. The top coat 50 could have various types of finishes, such as a gloss or soft-touch finish. The top coat 50 can be made, for example, of a layer of at least one of acrylic, urethane, and a combination of acrylic and urethane. Although FIGS. 5 and 6 show flexible layer 48 and top coat 50 applied evenly to the entire top surface of substrate 44, it should be understood that in other exemplary embodiments, flexible layer 48 and/or top coat 50 may only be applied to a portion of substrate 44 and may allow portions of substrate 44 and/or slats 42 to remain visible. Top coat 50 preferably has sufficient flexibility to inhibit the top coat 50 from cracking or becoming disengaged from the layer 48 or substrate 44 when flexed or cycled. Top coat 50 can be any material providing these characteristics, and it may be applied by a spray process or any other suitable process.

FIGS. 7 and 8 illustrate how the layer 48 (and top coat 50, if used) can conform to the substrate 44. On the left side of FIGS. 7 and 8, a geometric pattern (FIG. 7) and a metallic pattern (FIG. 8) are disposed on a substantially smooth substrate 44. On the right side of FIGS. 7 and 8, the same patterns are disposed on a substrate 44 having a series of grooves or notches. As shown on the right side of FIGS. 7 and 8, the layer 48 can be applied within the grooves and conform to the shape of the substrate 44. This can be particularly useful if the substrate 44 has been formed with a series of grooves or notches that break up the smooth outer surface to substantially hide any molding imperfections.

Figure 9:
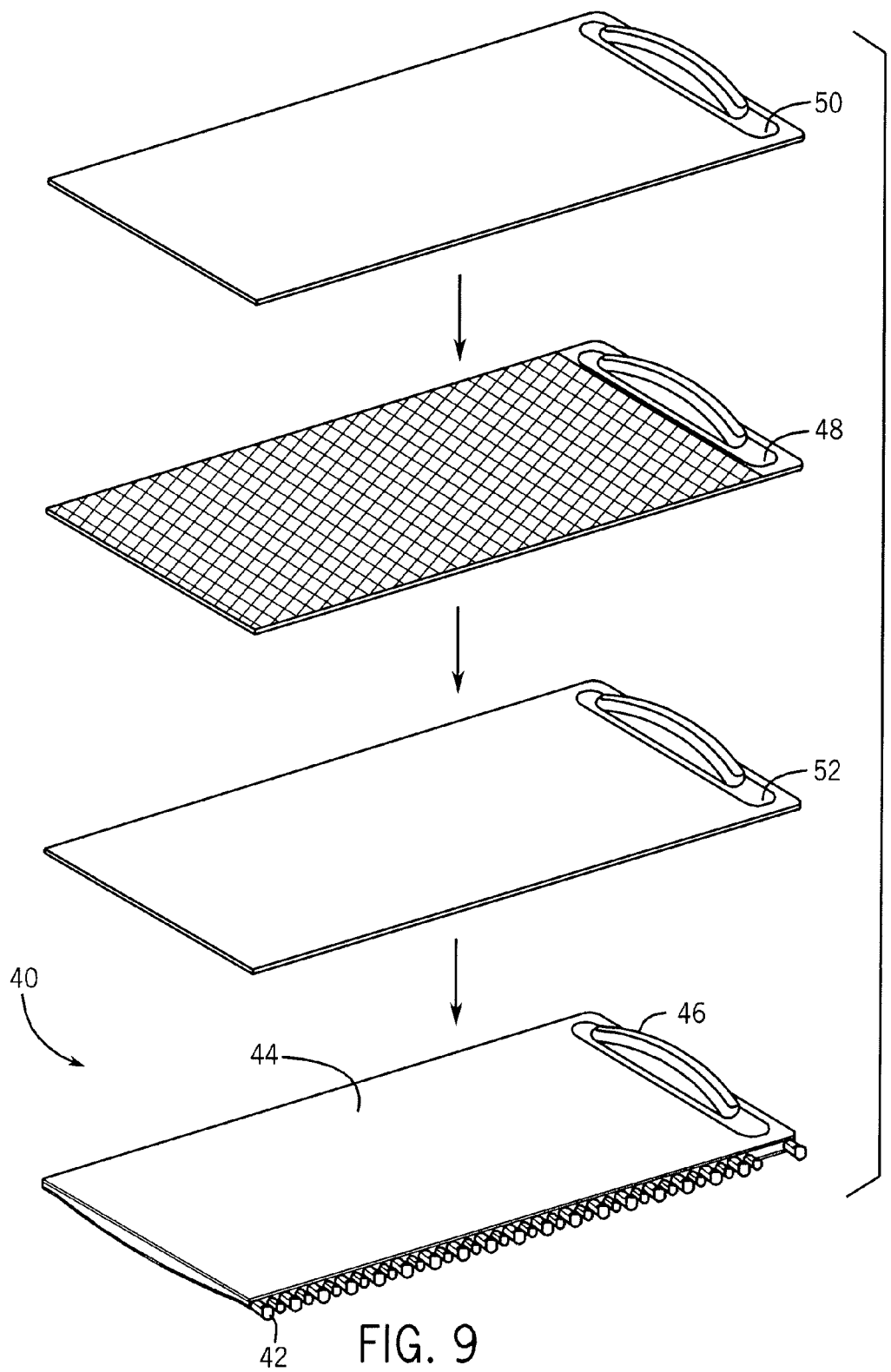
FIG. 9 is an exploded view of an exemplary embodiment of a door including a promoter layer.

Referring to FIG. 9, another embodiment of tambour door 40 may include a promoter layer 52 disposed between layer 48 and substrate 44. According to one exemplary embodiment promoter layer 52 is an adhesion promoter, such as a chlorinated polyolephin (when the layer 48 is ink). An adhesion promoter may be provided to promote adhesion between layer 48 and substrate 44 if substrate 44 is formed from a polymer with low surface tension or another material to which layer 48 does not adhere well.

According to still another exemplary embodiment, promoter layer 52 may be a paint layer. Some materials, such as TPE, are not easily pre-colored before molding. If such a material is used to form substrate 44, a colored promoter layer 52 may be applied to substrate 44 to provide a colored base. Layer 48 and top coat 50 may then be applied to promoter layer 52.

Although the figures show one exemplary embodiment of a tambour door 40 of a console as the flexible interior component, it should be understood that door 40 may be another type of door. For example, door 40 may be provided in an overhead console, a door panel, a dashboard, or any other suitable location in the vehicle. Moreover, the flexible interior component may be something different from a door. Additionally, although the disclosure above describes the layer 48 as being applied to the substrate 44, the layer 48 could be provide on other members, such as slats 42, which then function as the substrate for the layer 48.

For purposes of this disclosure, the term "coupled" means the joining of two members directly or indirectly to one another. Such joining may be stationary in nature or moveable in nature and/or such joining may allow for the flow of fluids, electricity, electrical signals, or other types of signals or communication between the two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

The construction and arrangement of the elements of the vehicle component as shown in the various exemplary embodiments is illustrative only. Although only a few embodiments of flexible interior components have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited herein (e.g., the color of the skin may differ from that of the substrate or may be substantially the same color as the substrate). For example, elements shown as integrally formed may be constructed of multiple parts or elements, the position of elements may be reversed or otherwise varied, and the nature or number of discrete elements or positions may be altered or varied. It should be noted that the elements and/or assemblies of the system may be constructed from any of a wide variety of materials that provide sufficient strength or durability, including any of a wide variety of moldable plastic materials (such as high-impact plastic) in any of a wide variety of colors, textures and combinations. Components such as those shown herein may be used in non-vehicle applications as well, including but not limited to furniture such as chairs, desks, benches, and other furniture items. Other substitutions, modifications, changes and omissions may be made in the design, operating conditions and arrangement of the preferred and other exemplary embodiments without departing from the scope of the present invention.

What is claimed is:

1. A vehicle console in a vehicle including a vehicle floor and two spaced apart seats, the vehicle console comprising:
   a structure including a front wall, a rear wall and two opposed side walls coupled to the front wall and rear wall, wherein an interior space is defined, and an opening in communication with the interior space; and
   an articulated door coupled to the structure and configured to close the opening, the articulated door comprising:
   a plurality of slats;
   a substrate connecting the plurality of slats, and
   an ink layer disposed on the substrate and that provides an appearance differing from the appearance of the substrate, wherein the ink layer is a flexible layer that is configured to substantially maintain the appearance as the substrate is cycled.

2. The vehicle console of claim 1 wherein the substrate is formed from a flexible polymer material.

3. The vehicle console of claim 1 wherein the appearance provided by the ink layer provides a decorative pattern.

4. The vehicle console of claim 1 wherein the appearance provided by the ink layer provides a reproduction of a photographic image.

5. The vehicle console of claim 1 further comprising a substantially flexible clear layer disposed on the ink layer.

6. The vehicle console of claim 5 wherein the substantially flexible clear layer is an overcoat of at least one of acrylic, urethane, and a combination of acrylic and urethane.

7. The vehicle console of claim 1 wherein the structure is configured to couple to the vehicle floor between the two seats.

8. The vehicle console of claim 1 wherein the substrate comprises a surface on which the ink layer is disposed that is substantially smooth.

9. The vehicle console of claim 1 wherein the substrate comprises a surface on which the ink layer is disposed that includes a plurality of grooves.

10. The vehicle console of claim 9 wherein the ink layer is applied within the plurality of grooves and conforms to the shape of the substrate.

11. The vehicle console of claim 9 wherein the ink layer provides a substantially smooth surface by substantially concealing the plurality of grooves.

12. The vehicle console of claim 1 wherein the ink layer comprises a promoter, the promoter being an adhesive configured to promote adhesion between the ink layer and the substrate.

13. The vehicle console of claim 1 wherein the ink layer comprises a promoter, the promoter being a paint.

14. The vehicle console of claim 1 wherein the ink layer is a substantially continuous layer that covers an entire outer surface of the substrate.

15. The vehicle console of claim 1 wherein the ink layer is disposed on only intermittent portions of an outer surface of the substrate.

16. The vehicle console of claim 1 wherein the ink layer provides the articulated door with the appearance of having a metallic finish.

17. The vehicle console of claim 1 wherein the ink layer provides a substantially smooth surface for the articulated door.

18. The vehicle console of claim 1 wherein the articulated door further comprises a handle configured to be grasped by a user.

19. The vehicle console of claim 18 wherein the handle is a protrusion outwardly extending near an end of the articulated door.

* * * * *